(12) United States Patent
Wang et al.

(10) Patent No.: US 8,205,842 B2
(45) Date of Patent: Jun. 26, 2012

(54) SUPPORT STRUCTURE

(75) Inventors: Jin-Xin Wang, Shenzhen (CN); Liang Wei, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 311 days.

(21) Appl. No.: 12/534,229

(22) Filed: Aug. 3, 2009

(65) Prior Publication Data
US 2010/0148022 A1      Jun. 17, 2010

(30) Foreign Application Priority Data

Dec. 15, 2008   (CN) .......................... 2008 1 0306250

(51) Int. Cl.
*F16M 11/04* (2006.01)
*E05D 7/00* (2006.01)

(52) U.S. Cl. ..................... 248/176.3; 248/150; 248/136; 248/917; 248/919; 16/221

(58) Field of Classification Search ............... 248/176.3, 248/150, 136, 528, 188.6, 917, 919, 460, 248/462, 472, 166; 16/271, 382, 221, 348, 16/352

See application file for complete search history.

(56) References Cited

U.S. PATENT DOCUMENTS

| 5,088,676 | A  | * | 2/1992  | Orchard et al. ............... 248/421 |
| 7,130,186 | B2 | * | 10/2006 | Yu .............................. 361/679.27 |
| 7,384,019 | B2 | * | 6/2008  | Choi ............................. 248/136 |
| 7,448,581 | B2 | * | 11/2008 | Lim et al. ..................... 248/176.3 |
| 7,631,841 | B1 | * | 12/2009 | Yen et al. ....................... 248/121 |
| 7,694,919 | B2 | * | 4/2010  | Lee ............................ 248/123.11 |
| 7,766,288 | B2 | * | 8/2010  | Kim et al. ................... 248/176.1 |
| 7,775,494 | B2 | * | 8/2010  | Yen et al. .................... 248/284.1 |
| 7,789,363 | B2 | * | 9/2010  | Duan ........................... 248/284.1 |
| 7,810,776 | B2 | * | 10/2010 | Long et al. ............... 248/346.03 |
| 2008/0023599 | A1 | * | 1/2008 | Lin ............................. 248/122.1 |

FOREIGN PATENT DOCUMENTS

| CN | 2739466 Y | 11/2005 |
| CN | 201075304 Y | 6/2008 |

* cited by examiner

*Primary Examiner* — Anita M King
(74) *Attorney, Agent, or Firm* — Altis Law Group, Inc.

(57) ABSTRACT

A support structure includes a base, a support member, and a connecting member. The base includes an inserting portion. The support member defines a receiving cavity to receive the inserting portion of the base. The connecting member includes a connection portion. The inserting portion of the base is movably connected to the connecting portion of the connecting member. When the inserting portion of the base and the connecting portion of the connecting member are out of the receiving cavity, the inserting portion of the base is movable to the connecting member such that the support member and the base are collapsible.

11 Claims, 5 Drawing Sheets

SUPPORT STRUCTURE

BACKGROUND

1. Technical Field

The present disclosure relates to a support structure employed in an electronic device.

2. Description of the Related Art

A typical support structure includes a support body, a hinge assembly, and an adjustment module. A display is fixed on the adjustment module. The hinge assembly rotatably connects the adjustment module to the support body. The support body includes a base and a connecting portion extending from the base. The base is substantially Y-shaped and has a relatively large area to ensure the base is stable.

However, the connecting portion is relatively long, thus increasing volume of the support body and rendering transportation and relocation inconvenient.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
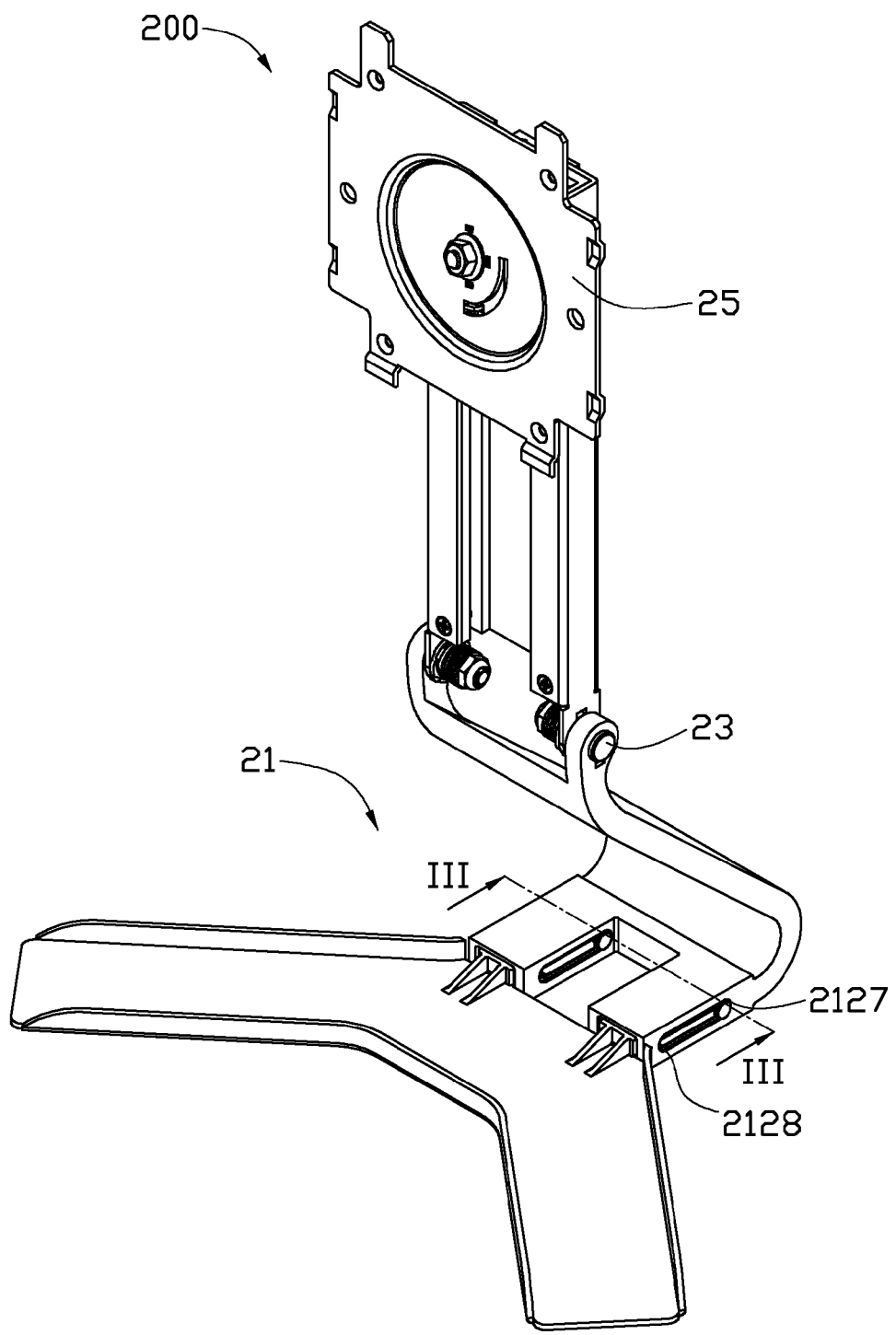
FIG. 1 is an isometric view of a support structure of the disclosure, in accordance with an embodiment.

Referring to FIG. 1, a support structure 200 includes a support module 21, a hinge assembly 23, and an adjustment module 25. The hinge assembly 23 rotatably connects the support module 21 to the adjustment module 25. A display (not shown) may be fixed on the adjustment module 25.

Figure 2:
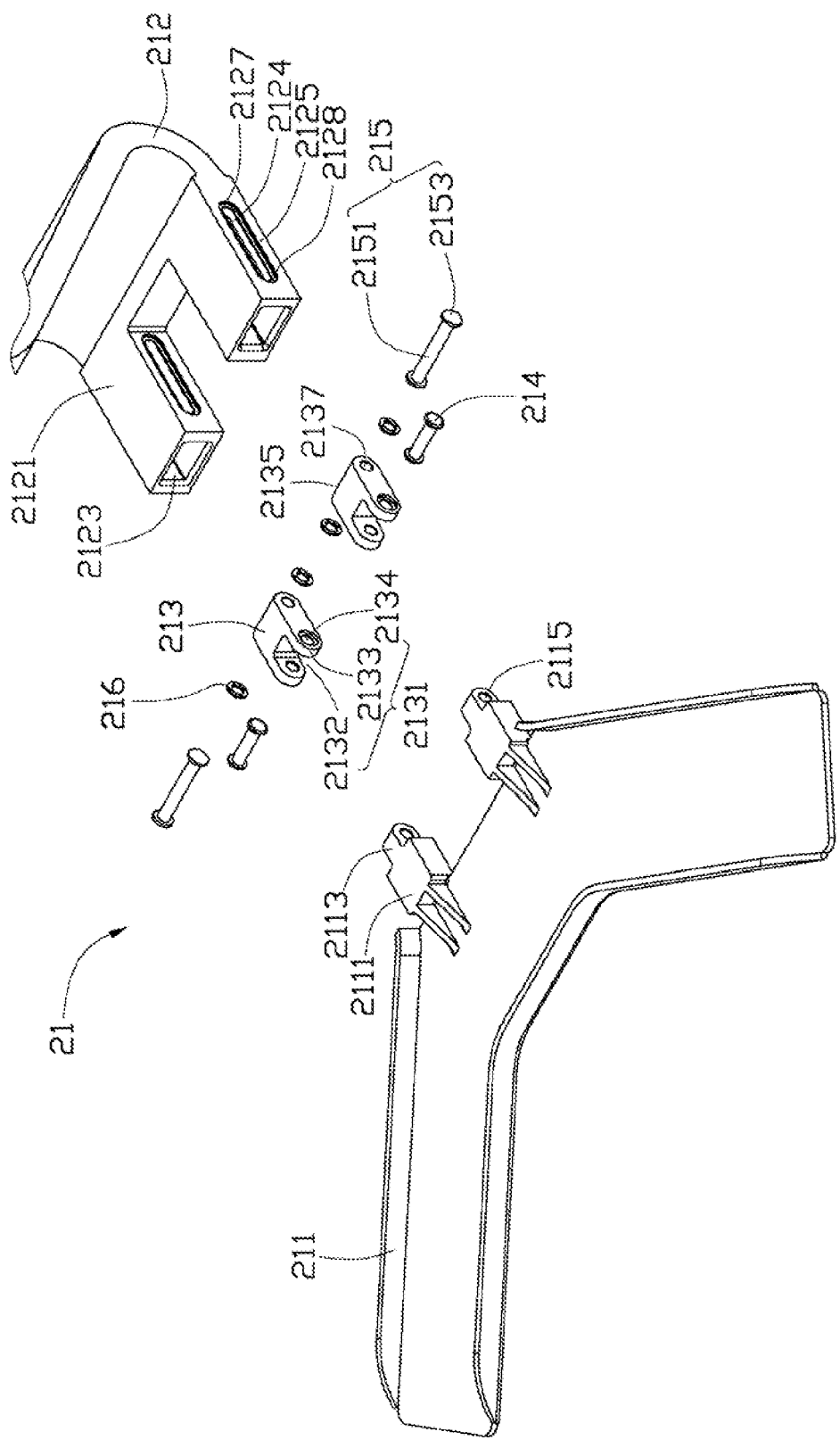
FIG. 2 is an exploded, isometric view of a portion of the support structure in FIG. 1.

Referring to FIG. 2, the support module 21 includes a base 211, a support member 212, two connecting members 213, two pivot shafts 214, two position pins 215, and two friction washers 216.

The base 211 may be substantially V-shaped. Two inserting portions 2111 are formed on the base 211. The inserting portions 2111 are adjacent to a center of the base 211. Each inserting portion 2111 may be substantially rectangular. A rotation portion 2113 is formed on an end of each inserting portion 2111. A pivot hole 2115 is defined in each rotation portion 2113.

The support member 212 may be substantially S-shaped. Two receiving portions 2121 are formed on an end of the support member 212. The receiving portions 2121 may be substantially rectangular. A receiving cavity 2123 is defined in each receiving portion 2121 to receive the inserting portions 2111 of the base 211 and the connecting members 213.

Figure 3:
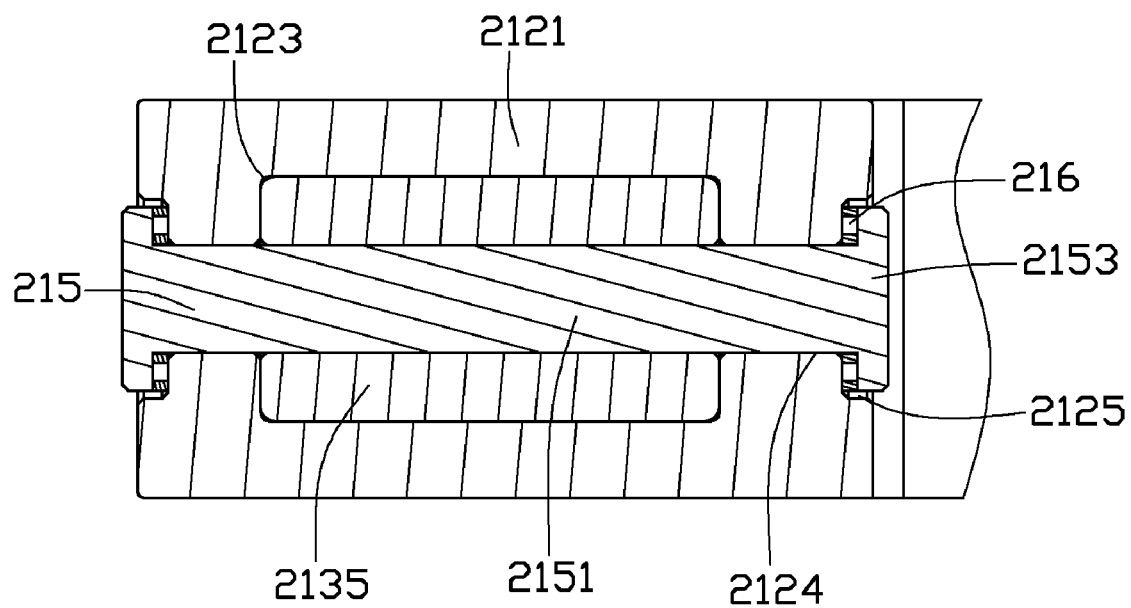
FIG. 3 is a partial, cross-section view of the support structure of FIG. 1, taken along the line III-III in FIG. 1.

Referring to FIG. 3, opposite closed sliding slots 2124 are defined in opposite sidewalls of each receiving cavity 2123 respectively. A constraint depression 2125 is defined in a periphery of each sliding slot 2124.

Each connecting member 213 includes a connecting portion 2131 and a sliding portion 2135. The connecting portion 2131 extends from the sliding portion 2135. A position hole 2137 is defined in the sliding portion 2135. The connecting portion 2131 includes two tabs 2133. The tabs 2133 cooperatively define an inserting slot 2132 to receive one of the rotation portions 2113. A connecting hole 2134 is defined in each tab 2133.

The position pins 215 may be substantially cylindrical. Each position pin 215 includes a pin body 2151 to engage the position holes 2137 and two flange portions 2153 formed on two ends of the pin body 2151 to prevent the pin body 2151 from detaching from the position holes 2137.

During assembly, the rotation portions 2113 of the base 211 are inserted into the inserting slots 2132 of the connecting members 213, the pivot shafts 214 pass through the connecting holes 2134 of the connecting members 213 and the pivot holes 2115 of the rotation portions 2113 of the base such that the connecting members 213 are rotatable relative to the base 211.

The connecting members 213 are received in the position cavities 2123 of the support member 212. Then an end of one position pin 215 passes through one friction washer 216, one sliding slot 2124 of one receiving portion 2121 of the support member 212, the position hole 2137 of one connecting member 213, another friction washer 216, and another sliding slot 2124 of the corresponding receiving portion 2121 orderly, and the flange portions 2153 of the corresponding position pin 215 are received in the constraint depressions 2125 and the friction washers 216 are between the flange portions 2153 of the position pins 215 and the support member 212. As a result, one connecting member 213 is slidably positioned in the support member 212. Similarly, another connecting member 213 may be slidably positioned in the support member 212 in the same means.

When a display employing the support structure 200 is supported on a surface, the pin bodies 2151 of the position pins 215 are on a first end 2127 of the sliding slots 2124 (as shown in FIG. 1), and the inserting portions 2111 of the base 211, the pivot shafts 214, and the connecting members 213 are received in the position cavities 2123 of the support member 212. The base 211 is non-rotatable relative to the connecting members 213 and the support member 212 due to constraint of the receiving cavities 2123 of the support member 212. Furthermore, the receiving portions 2121 of the support member 212 engage the inserting portions 2111 of the base 211 to support the display.

Figure 4:
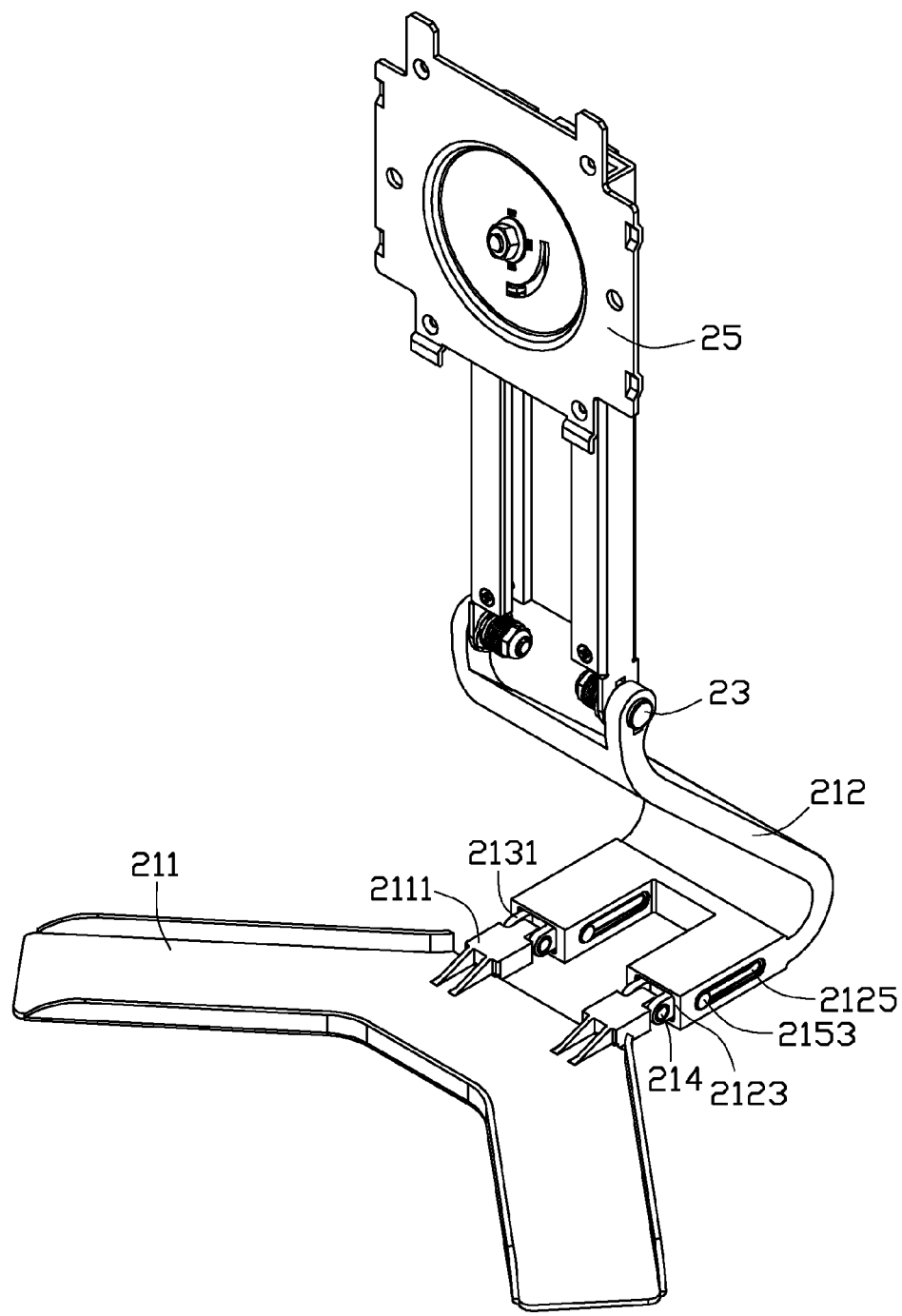
FIG. 4 is similar to FIG. 1, but shows the support structure in an upstraight state.

When external force is applied to slide the base 211, the base 211 and the connecting members 213 slide relative to the support member 212 until the pin bodies 2151 of the position pins 215 are on a second end 2128 of the sliding slots 2124 of the support member 212 (as shown in FIG. 4). Simultaneously, the inserting portions 2111 of the base 211, the pivot shafts 214, and the connecting portions 2131 of the connecting members 213 are out of the position cavities 2123. As a result, the base 211 is rotatable relative to the connecting members 213 and the support member 212. Therefore, the support module 21 may be collapsed and volume thereof decreased.

Figure 5:
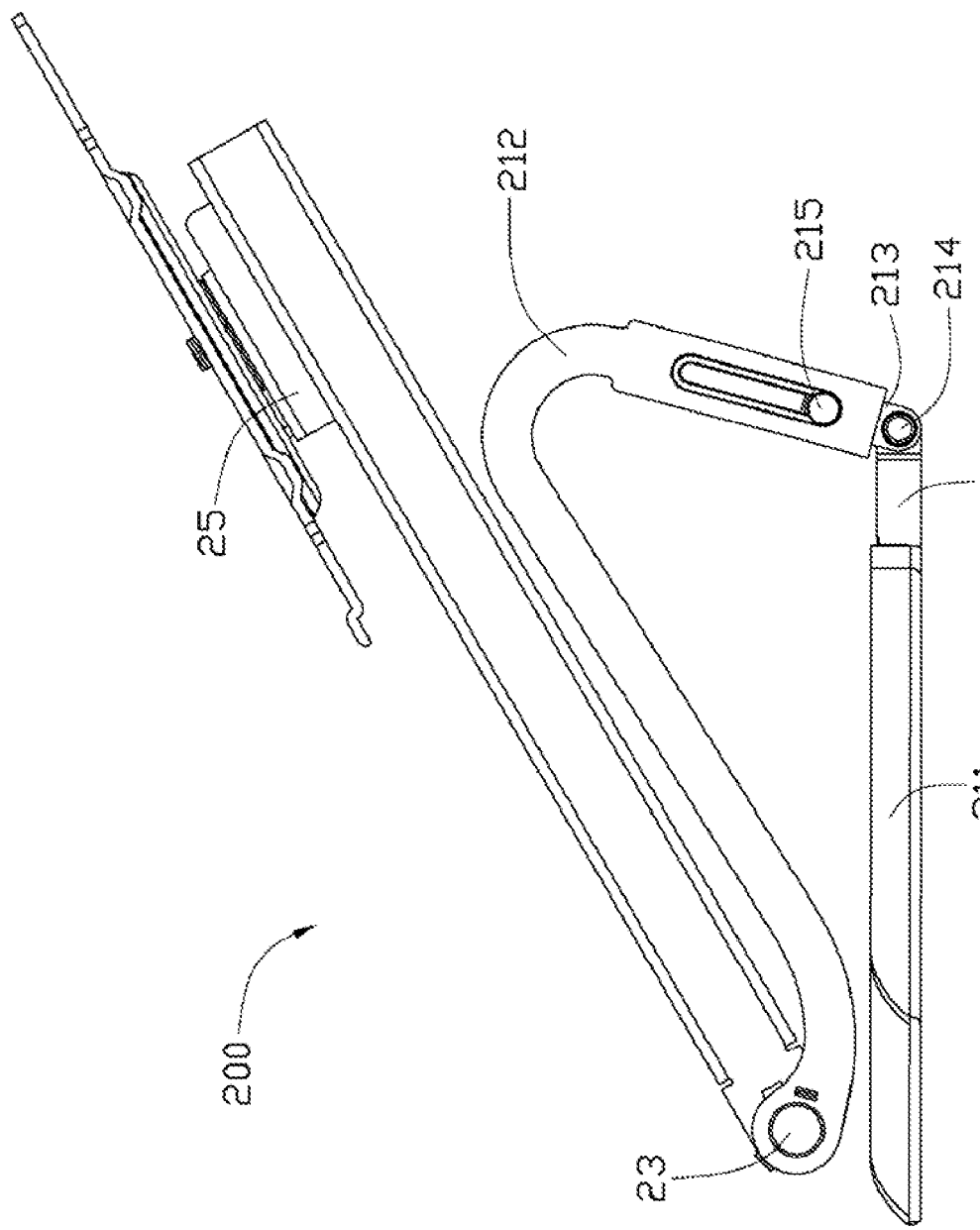
FIG. 5 is a side view of the support structure in FIG. 1 in a collapsed state.

Furthermore, Referring to FIG. 5, the adjustment module 25 may rotate relative to the support module 21 via the hinge assembly 23, such that the adjustment module 25 may move close to the support member 212, thereby further reducing volume of the support structure 200 in a collapsed state.

It can be understood that the connecting members 213 and the inserting portions 2111 of the base 211 may be connected by a soft member such as a chain, and the pivot shafts 214 omitted. Furthermore, the inserting portions 2111 of the base 211 may be positioned on the support member 212 and the position cavities 2123 defined in the base 211.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. A support structure, comprising:
a base comprising an inserting portion;
a support member defining a receiving cavity to receive the inserting portion of the base; and
a connecting member comprising a connecting portion; wherein the connecting member is received in the receiving cavity, the inserting portion of the base is connected to the connecting portion of the connecting member; and when the inserting portion of the base and the connecting portion of the connecting member are out of the receiving cavity of the support member, the inserting portion of the base is rotatable relative to the connecting member and the support member such that the support member and the base are collapsible.

2. The support structure of claim 1, further comprising a pivot shaft rotatably connecting the connecting portion of the connecting member to the inserting portion of the base, wherein the connecting member further comprises a sliding portion slidably received in the receiving cavity of the support member, from which the connecting portion extends.

3. The support structure of claim 2, further comprising a rotation portion formed on an end of the inserting portion of the base, wherein the connecting portion of the connecting member includes two tabs cooperatively defining an inserting slot; and the rotation portion of the base is received in the inserting slot of the connecting member.

4. The support structure of claim 3, wherein a connecting hole is defined in each tab; a pivot hole is defined in the rotation portion of the base; and the pivot shaft passes the connecting holes of the tabs and the pivot hole of the rotation portion of the base to rotatably connect the connecting member to the base.

5. The support structure of claim 1, further comprising a position pin, wherein opposite closed sliding slots are defined in opposite sidewalls of the receiving cavity of the support member respectively; the position pin passes through the sliding slots of the support member; and the connecting member is positioned on the position pin; and when the position pin is on a first end of the sliding slots, the connecting portion of the connecting member is in the receiving cavity; and when the position pin is on a second end of the sliding slots, the connecting portion of the connecting member is out of the receiving cavity.

6. The support structure of claim 5, wherein a constraint depression is defined in a periphery of each sliding slot of the support member; and two flange portions are formed on two ends of the position pin to engage the constraint depressions of the support member.

7. The support structure of claim 6, further comprising a friction washer between one of the flange portions of the position pin and the support member.

8. The support structure of claim 1, wherein an end of the support member forms a receiving portion in which the receiving cavity is defined.

9. The support structure of claim 1, further comprising an adjustment module positioned on the support member.

10. The support structure of claim 9, further comprising a hinge assembly rotatably connecting the adjustment module to the support member.

11. A support structure, comprising:
a base comprising two inserting portions;
a support member defining two receiving cavities to receive the inserting portions of the base; and
two connecting members, each comprising a connecting portion; wherein the two connecting members are respectively received in the two receiving cavities, the inserting portions of the base are rotatably connected to the connecting portions of the connecting members; and when the inserting portions of the base and the connecting portions of the connecting members are out of the receiving cavities of the support member, the inserting portions of the base are rotatable relative to the connecting members and the support member such that the support member and the base are collapsible.

* * * * *